United States Patent [19]

Winters

[11] 4,212,313
[45] Jul. 15, 1980

[54] SHOCK SHUTOFF VALVE

[75] Inventor: Harry K. Winters, San Rafael, Calif.

[73] Assignee: The Regents of the University of California, Berkeley, Calif.

[21] Appl. No.: 933,278

[22] Filed: Aug. 14, 1978

[51] Int. Cl.² ............................................. F16K 17/36
[52] U.S. Cl. ........................................ 137/39; 251/65
[58] Field of Search ....................... 137/38, 39; 251/65

[56] References Cited

U.S. PATENT DOCUMENTS

| | | | |
|---|---|---|---|
| 2,585,316 | 2/1952 | Hobson | 137/38 |
| 3,026,903 | 3/1962 | Roach | 251/65 X |
| 3,468,338 | 9/1969 | Patterson | 251/65 X |
| 3,747,616 | 7/1973 | Lloyd | 137/38 |
| 3,850,189 | 11/1974 | Follet | 251/65 X |

FOREIGN PATENT DOCUMENTS 914086  5/1954  Fed. Rep. of Germany ............. 251/65
744858  2/1956  United Kingdom ...................... 251/65

Primary Examiner—Robert G. Nilson
Attorney, Agent, or Firm—Lothrop & West

[57] ABSTRACT

A shock shutoff valve, especially for earthquake zones, has a valve body with a normally vertical flow bore therein controlled by a plug rotatable within the valve body. A portion of the flow bore in the plug is so movable between an open position and a closed position. A pedestal in the flow bore is adjacent a seat around the plug portion of the flow bore. A ball resting on the pedestal can be dislodged by shock to move from the pedestal and roll into the seat and so block the flow bore. The seat and the ball are of mutually attracting magnetic materials effective to urge the ball and the seat together not under normal conditions but when the valve body has been displaced and the flow bore is inclined to the vertical.

2 Claims, 5 Drawing Figures

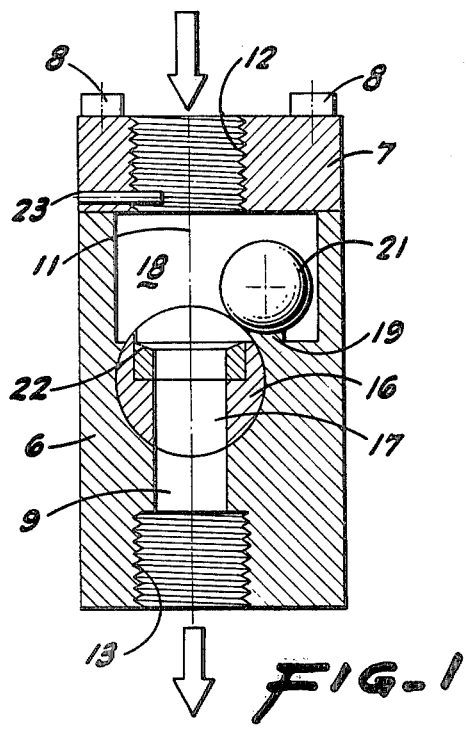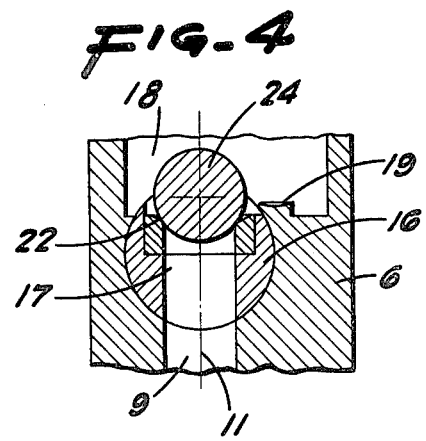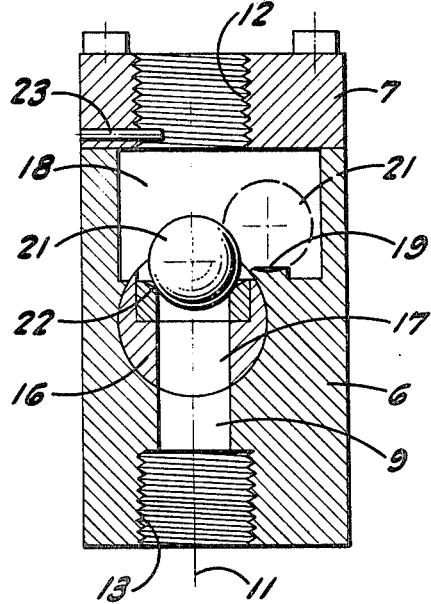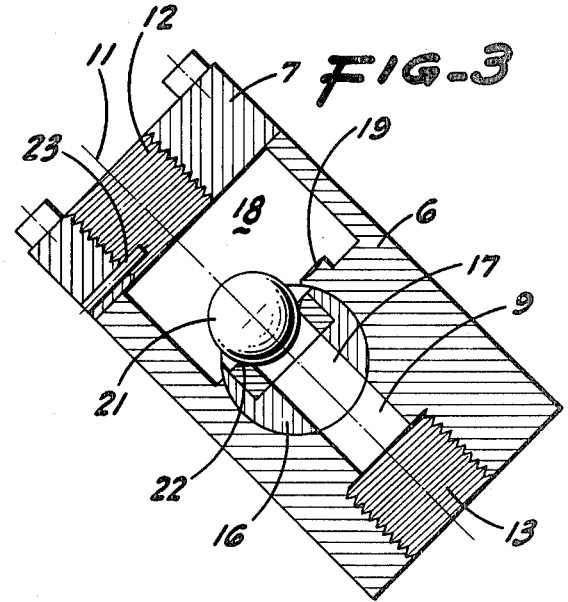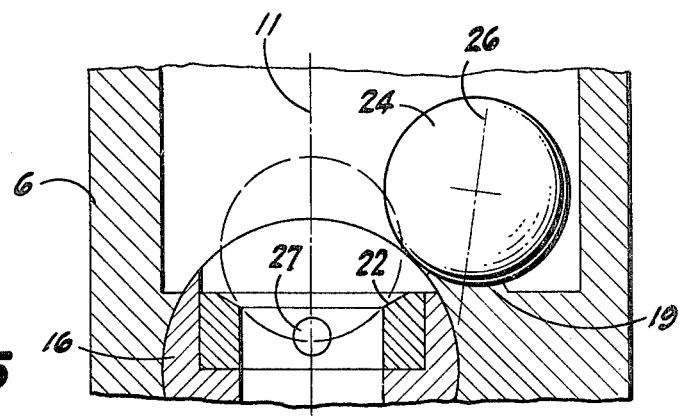

SHOCK SHUTOFF VALVE

BRIEF SUMMARY OF THE INVENTION

For fluid conduits, particularly gas pipes in earthquake-prone country or earthquake zones, it is highly advisable to have installed in the line a shutoff valve responsive to the quake itself so that the flowing fluid, expecially gas, will be interrupted. Valves of that sort are subject to a difficulty in that a substantial earthquake shock may change the orientation or position of the valve and perhaps some of its attendant piping from their normal positions into radical or abnormal positions. The present device not only has a ball which can be shock-shaken into a flow-stopping location, but furthermore is held in its shutoff or flow-stopping location even though the valve body may be moved into an unusual or abnormal attitude. The valve continues closed despite the displacement. This is preferably accomplished by the flow passage rim and the ball being of magnetic materials, so that there is a magnetic urgency to hold them together once they are in or near closure.

BRIEF DESCRIPTION OF THE SEVERAL VIEWS OF THE DRAWING

FIG. 1 is a cross-section on a vertical longitudinal plane through a shock shutoff valve constructed pursuant to the invention and shown in normal position for through flow.

FIG. 2 is a view comparable to FIG. 1 but showing the valve after the valve has been automatically shut off in response to a shock such as an earthquake shock.

FIG. 3 is a view comparable to FIG. 2 and showing the structure in an abnormal or canted position after dislodgment from a normal location.

FIG. 4 is a fragmentary view comparable to FIG. 2 but showing an inversion of materials in the ball and seat.

FIG. 5 is a view like FIG. 2 but showing a modified form of device.

DETAILED DESCRIPTION

An arrangement of the general sort shown herein is disclosed in my copending application entitled "Shake Responsive Valve", Ser. No. 798,825 filed May 20, 1977, now U.S. Pat. No. 4,111,220 and assigned to the assignee hereof. The present showing is much the same as in the mentioned patent, to which reference is made for further detailed information. There is primarily a valve body 6, usually of bronze or like material, having a removable valve body cap 7 secured in place by fasteners 8. There is a flow passage 9 through the valve body, the passage being generally symmetrical about a through axis 11. Under all normal circumstances of installation, the axis 11 is substantially vertical.

Part of the flow passage 9 at the entrance to the valve is inclusive of an entrance port 12 of a tapped nature for the reception of an inlet pipe, such as a standard gas pipe, whereas another part of the flow passage is inclusive of another tapped opening 13 constituting an outlet for connection to a standard receiving pipe. Also included in the valve body is a valve plug 16 rotatable in the customary fashion about a cross axis intersecting the axis 11 and operable by any suitable means such as a handle, not shown. The plug 16 has a part 17 of the flow passage through it arranged so that when the plug is in the position shown in FIG. 1 there can readily be flow through the entire valve, but when the plug 16 is rotated approximately ninety degrees from the position shown, then the plug obstructs the flow passage and flow is stopped.

Within a chamber 18 in the valve body and which itself can be part of the flow passage, there is provided a pedestal 19 disposed alongside the plug 16 and normally having a flat or nearly flat upper surface in a plane normal to the axis 11 in the customary installation. Within the chamber 18 and resting by gravity on the pedestal 19 is a ball 21.

In the event of a shock, especially an earthquake shock, the ball 21 is readily dislodged from the pedestal 19 and once dislodged rolls into the passageway 17 and comes to rest upon a seat 22 of annular form circumscribing the opening 17. The diameter of the ball is such that it blocks the passageway 17 and precludes further flow, all as indicated in FIG. 2. The ball can be restored to its initial position by rotation of the plug 16, as described in my indicated patent, but the ball cannot leave the chamber 18 without removal of the top 7 thereof because there is an obstructing pin 23 projecting into the entrance port for that reason.

Although the structure as so far described and as shown in the accompanying application is entirely satisfactory, it may occur under some earthquake conditions, particularly major shocks in the immediate zone or area of installation of the valve, that the valve body cannot retain its initially upright normal position as shown in FIGS. 1 and 2. Rather, the valve body can be cocked or canted or dislodged into a position as shown in FIG. 3. The axis 11 assumes an attitude of the order of forty-five degrees to the vertical or initial position. Under those circumstances, the valve may not remain closed. Either minor shocks or gravity can dislodge the ball 21 to fall away from the seat 22 and to permit resumption of gas flow.

To preclude this possibility, I have now improved the structure to provide a ball 21 made of material readily attracted by a magnet and to provide a valve seat 22 made of a magnetically attractive material. The seat, as shown, is a separate ring lodged in the valve plug 16. It is possible to have the plug itself of magnetic material or to provide other arrangements of a comparable nature in which the valve ball 21 and the seat 22 when near each other are urged together. There is a substantial magnetic attraction holding the ball closed despite the momentary attitude of the valve body.

As an alternate, as shown in FIG. 4, the seat 22 can be of material susceptible to magnetic attraction, and the ball, now designated 24, is geometrically or physically the same as before but is of a magnetic material effective to cooperate with the material of the seat 22. In both instances, the effect of the magnetic arrangement is to urge the ball and the seat into close juxtaposition despite the fact that the valve body itself may be moved about substantially and may be displaced into an attitude far from vertical and may actually be virtually in a horizontal position or conceivably even somewhat below horizontal.

The geometry of the ball and the pedestal are such that even high mutual magnetic attraction does not pull the ball from the pedestal when the valve body is upright, although it can be arranged that only a little deviation of the valve body from upright may permit the magnetic force to augment gravity until the ball seats in the plug and then even to oppose gravity once the ball is seated.

Despite the provision of the magnetic force between the ball and the valve seat, the ball can be mechanically restored to its pedestal, as described in the above-identified patent, when and if the valve itself is rehabilitated into its initial position for reuse.

In the described arrangement of the valve, the magnetic attracting force is directional, so that an earthquake or comparable shock from one predominant direction is somewhat more likely to dislodge the ball than is an earthquake of a similar magnitude but acting from a different direction. At least partly to reduce or overcome the directional factor, I sometimes arrange the pedestal 19, as shown in FIG. 5, with its axis 26 inclined with respect to the axis 11 in a direction away from the predominant magnetic pull. The inclination is such that for normal valve orientation the force necessary to dislodge the ball is substantially uniform no matter what its direction.

For a similar reason, I sometimes prefer to use not a single magnet, but a pair of magnets 27 as shown in FIG. 5. These are preferably of a relatively high intensity characteristic and are disposed in a non-magnetic ring on opposite transverse sides of the axis 11. This has an advantage of moving the magnets somewhat farther from the ball and so reducing the non-uniformity of the pull, but also allows a further distribution of the forces. The magnets 27 can be inserted directly into the valve body, but a ring mounting allows manufacturing flexibility. The use of an inclined pedestal and a plurality of magnets is a further variation.

I claim:

1. A shock shutoff valve comprising a valve body, means within said body defining a flow bore symmetrical about a normally vertical axis, a rotary plug, means on said plug adapted in one position of said plug to continue said flow bore, means in said plug defining a valve seat around said flow bore, a pedestal in said body alongside of and above said valve seat, a magnetically responsive ball adapted to rest on top of said pedestal and to roll from said pedestal downwardly toward and into said valve seat in position to block said flow bore, and magnetic means for axially urging said ball and said valve seat into close abutment in said position even when said axis is inclined to the vertical and gravity tends to urge said ball out of said seat.

2. A device as in claim 1 in which said flow bore is at least in part defined in a valve plug mounted for rotation in said valve body, and said valve seat is a ring of magnetic material disposed in said plug around said flow bore.

* * * * *